(12) United States Patent
Nakano

(10) Patent No.: US 6,291,963 B2
(45) Date of Patent: Sep. 18, 2001

(54) DRIVE CIRCUIT FOR MOTOR/GENERATOR

(75) Inventor: Masaki Nakano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/734,193

(22) Filed: Dec. 12, 2000

(30) Foreign Application Priority Data

Dec. 15, 1999 (JP) .................................... 11-356180
Sep. 13, 2000 (JP) .................................... 12-277621

(51) Int. Cl.[7] ...................................................... H02P 5/34
(52) U.S. Cl. .............................................................. 318/801
(58) Field of Search ...................... 318/701, 432, 318/434, 798, 801, 802, 433, 460; 363/132, 137, 138; 322/58, 20, 24, 25

(56) References Cited

U.S. PATENT DOCUMENTS

| | | | |
|---|---|---|---|
| 5,703,449 | * 12/1997 | Nagate et al. | 318/254 |
| 5,834,911 | * 11/1998 | Kimura | 318/254 |
| 6,049,152 | 4/2000 | Nakano | 310/114 |
| 6,078,161 | * 6/2000 | Kim et al. | 318/701 |

FOREIGN PATENT DOCUMENTS 6-311783   11/1994   (JP) .
11-275826  10/1999   (JP) .

* cited by examiner

Primary Examiner—Shawn Riley
(74) Attorney, Agent, or Firm—Foley & Lardner

(57) ABSTRACT

A polyphase alternating current is supplied from an inverter (22) to a plurality of coils (L1–L12) of a motor/generator (10, 11). A plurality of PWM signal generating circuits (26) respectively control the current supplied to the coils (L1–L12) such that the difference between the electrical potential at a neutral point (Nm) of the coils (L1–L12) and the electrical potential at the neutral point (Ni) of the output terminals (TO) of the inverter (22) is reduced. Such control suppresses the generation of noise and vibration and torque fluctuations in the motor/generator (10, 11) due to a disconnection in the coils (L1–L12).

9 Claims, 18 Drawing Sheets

25 : LOW PASS FILTER
26 : PWM SIGNAL GENERATING CIRCUIT
27 : OSCILLATOR
28 : CARRIER SIGNAL GENERATOR

25 : LOW PASS FILTER
26 : PWM SIGNAL GENERATING CIRCUIT
27 : OSCILLATOR
28 : CARRIER SIGNAL GENERATOR

25 : LOW PASS FILTER
26 : PWM SIGNAL GENERATING CIRCUIT
27 : OSCILLATOR
28 : CARRIER SIGNAL GENERATOR

25 : LOW PASS FILTER
26 : PWM SIGNAL GENERATING CIRCUIT
27 : OSCILLATOR
28 : CARRIER SIGNAL GENERATOR

25 : LOW PASS FILTER
26 : PWM SIGNAL GENERATING CIRCUIT
27 : OSCILLATOR
28 : CARRIER SIGNAL GENERATOR

25 : LOW PASS FILTER
26 : PWM SIGNAL GENERATING CIRCUIT
27 : OSCILLATOR
28 : CARRIER SIGNAL GENERATOR
35 : LIMITER

25 : LOW PASS FILTER
26 : PWM SIGNAL GENERATING CIRCUIT
27 : OSCILLATOR
28 : CARRIER SIGNAL GENERATOR

25 : LOW PASS FILTER
26 : PWM SIGNAL GENERATING CIRCUIT
27 : OSCILLATOR
28 : CARRIER SIGNAL GENERATOR

25 : LOW PASS FILTER
26 : PWM SIGNAL GENERATING CIRCUIT
27 : OSCILLATOR
28 : CARRIER SIGNAL GENERATOR

DRIVE CIRCUIT FOR MOTOR/GENERATOR

FIELD OF THE INVENTION

This invention relates to control of a polyphase alternating-current motor/generator during mal-functions in a circuit component of an inverter or when a coil becomes disconnected.

BACKGROUND OF THE INVENTION

Tokkai Hei 11-275826 published by the Japanese Patent Office in 1999 discloses a motor/generator which drives a plurality of rotors independently by applying a polyphase alternating current to stator coils. The invention disclosed in Tokkai Hei 11-275826 forms a part of the invention that has been filed at the USPTO as U.S. patent application Ser. No. 09/275,785 on Mar. 25, 1999 before the priority date of this invention and was granted as U.S. Pat. No. 6,049,152 after the priority date of this invention.

Tokkai Hei 6-311783 published by the Japanese Patent Office in 1994 discloses a motor/generator provided with two groups of coil units each comprising three coils connected by a star connection and supplied with a three-phase alternating current. A control circuit detects neutral electrical potential of each coil unit and therefore detects disconnections, short circuiting and earthing of coils based on the obtained electrical phase differences.

SUMMARY OF THE INVENTION

The motor/generator disclosed in Tokkai Hei 11-275826 generates torque fluctuations, noise or vibrations for instance when a disconnection occurs in a coil of the motor/generator or when a circuit component of the inverter malfunctions. Although the motor/generator disclosed in Tokkai Hei 6-311783 detects such mal-functions, it does not comprise a function of preventing torque fluctuation, noise or vibration.

It is therefore an object of this invention to suppress the generation of torque fluctuations, noise and vibration in a motor/generator when a coil is disconnected or a circuit component is mal-functioning.

In order to achieve the above object, this invention provides a drive circuit for such a motor/generator that is provided with a stator and a rotor. The stator comprises a plurality of coils each of which has a first terminal. The rotor rotates due to a rotating magnetic field formed by the coils when a polyphase alternating current is supplied to the first terminals of the coils. The drive circuit to drive this motor/generator comprises a source of direct current, an inverter, a difference detection circuit and a plurality of signal generating circuits. The inverter converts the direct current to a polyphase alternating current based on control signals each of which corresponds to each phase of the current, and supplies the polyphase alternating current to the first terminals of the coils. The difference detection circuit detects a difference in electrical potentials at two different neutral points in an electrical circuit constituted by the motor/generator and the drive circuit. Each of the signal generating circuits generates the control signal corresponding to each phase of the current in response to the difference in the electrical potentials.

The details as well as other features and advantages of this invention are set forth in the remainder of the specification and are shown in the accompanying drawings.

DESCRIPTION OF THE PREFERRED EMBODIMENTS

Figure 1:
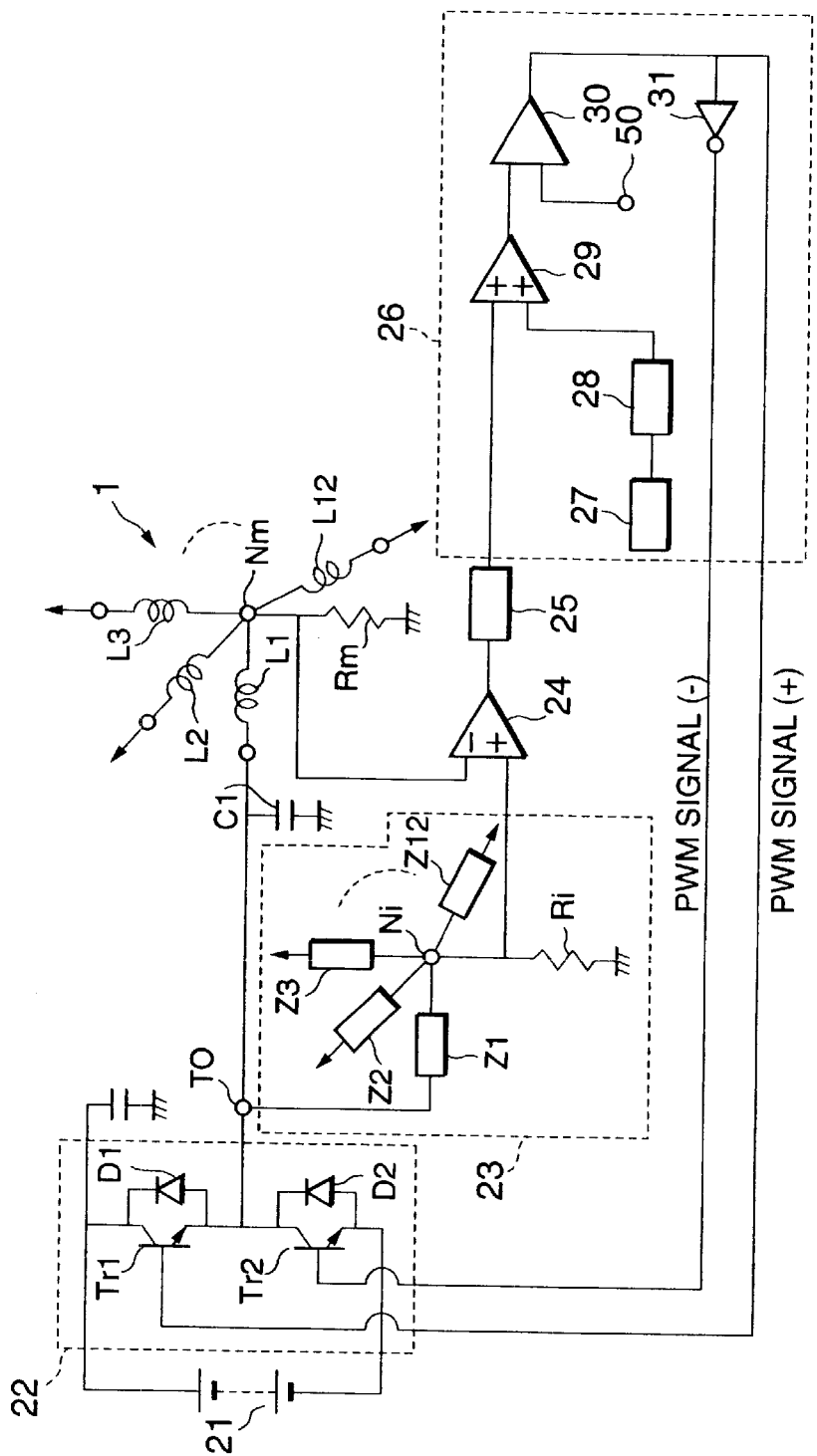
FIG. 1 is a circuit diagram of a drive circuit for a motor/generator according to this invention.

Referring to FIG. 1 of the drawings, a motor/generator as a motive force source of a vehicle is provided with twelve coils L1, L2, L3 . . . L12 on a stator 1.

This motor/generator corresponds to a motor/generator of the first embodiment in U.S. patent application Ser. No. 09/275,785 (U.S. Pat. No. 6,049,152), which is herein incorporated by reference.

In order to drive the motor/generator 1, the drive circuit of this invention is provided with a battery 21 mounted in the vehicle, an inverter 22, an inverter neutral point voltage detecting circuit 23, a differential amplifier 24, a low pass filter 25 and a plurality of PWM signal generating circuits 26. The term "PWM signal" denotes a pulse width modulation signal.

A direct current (hereafter referred to DC currents) from the automobile battery 21 is converted into a polyphase alternating current (hereafter referred to AC currents) with an inverter 22 and is output to the coils L1–L12 from output terminals TO provided in the inverter 22. The inverter 22 comprises plural inverter units each of which generates a single phase AC current with two transistors Tr1 and Tr2 and two diodes D1 and D2 according to the PWM signals input into the base of the transistors Tr1 and Tr2, and outputs the current from the output terminal TO.

Figure 4:
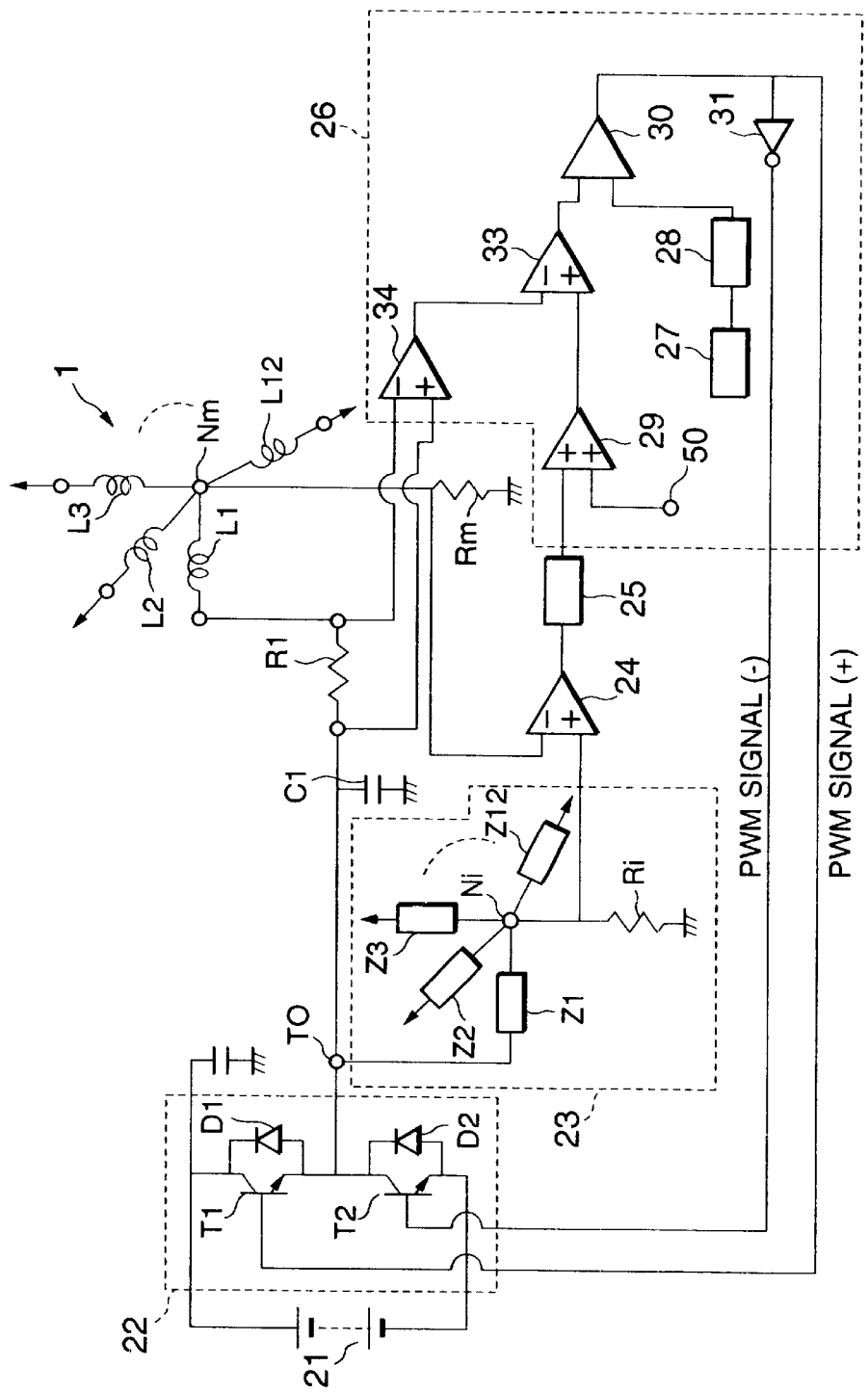
FIG. 4 is similar to FIG. 1, but showing a fourth embodiment of this invention.

The PWM signals comprise an affirmative PWM signal input to the base of a transistor Tr1 and a negative PWM having an opposite phase which is input into the base of the transistor Tr2. In the figure, only the single phase inverter unit which supplies an AC current to the coil L2 is shown. The inverter 22 comprises twelve inverter units connected in parallel to the battery 21 as shown in FIG. 4 of U.S. application Ser. No. 09/275,785. The output terminal TO of each inverter unit is connected to one end of each coil L1–L12.

The wiring from each inverter unit to each coil L1–L12 is earthed through respective capacitors C1 in order to perform a noise-cutting function.

The other end of each coil L1–L12 is connected to the motor neutral point by a star connection and the motor neutral point Nm is earthed through a resistor Rm.

The inverter neutral point voltage detecting circuit 23 comprises twelve impedance components Z1, Z2, Z3 . . . Z12 and a resistor Ri. One end of each impedance component Z1–Z12 is connected to each respective output terminal TO of the inverter 22. The other end of each impedance components Z1–Z12 is connected to the inverter neutral point Ni by a star connection. The inverter neutral point Ni is earthed through the resistor Ri.

The voltage of the motor neutral point Nm and the voltage of the inverter neutral point Ni is input into a differential amplifier 24. The differential amplifier 24 amplifies the difference of these voltages and inputs the differential voltage into a low pass filter 25. The low pass filter 25 has the function of eliminating high frequency components from the input signal which mainly result from the switching noise of the inverter 22. The output of the low pass filter 25 is input into each of the PWM signal generating circuits 26.

Each of the PWM signal generating circuits 26 comprises an oscillator 27, a carrier signal generator 28, summing amplifier 29, a comparator 30 and an inverting amplifier 31.

The oscillator 27 generates a fixed cycle pulse signal. The carrier signal generator 28 generates a carrier signal having a triangular wave form from the pulse signal. This signal corresponds to a carrier signal having a fixed wave form as described in the claims.

The summing amplifier 29 sums the carrier signal and the differential voltage of the neutral points output by the low pass filter 25 and inputs a current signal corresponding to the calculation result into the comparator 30. The comparator 30 compares the input signal with a target voltage signal input to a target voltage input terminal 50. The result of this comparison is output to the base of the transistor Tr1 of the inverter 22 as an affirmative PWM signal. The inverting amplifier 31 outputs the comparison result of the comparator 30 to the base of the transistor Tr2 of the inverter 22 as a negative PWM signal. The target voltage signal is a signal input from the outside in response to vehicle speed and a depression amount of a vehicle accelerator pedal for example.

Of the PWM signal generating circuits 26, FIG. 1 shows only one circuit which is related to the output of AC current to the coil L1 of the stator 1.

There are however twelve PWM signal generating circuits 26 for the twelve coils L1–L12.

It is possible to provide a single oscillator 27 and carrier signal generator 28 in the drive circuit, and share them by the twelve PWM signal generating circuits 26.

The drive circuit comprises a single inverter neutral point voltage detecting circuit 23, while comprising amplifiers 24 and low pass filters 25 for respective coils L1–L12.

When the motor/generator 1 is operated by the drive circuit under normal operational conditions, the voltage of the motor neutral point Nm and the inverter neutral point Ni take a value of zero. Thus the input signal from the low pass filter 25 to the PWM signal generating circuits 26 is zero. As a result, a PWM signal corresponding to the target voltage signal is output from each comparator 30 and each inverting amplifier 31 to each inverter unit of the inverter 22 with a fixed phase difference.

Even when a coil of a certain phase has become disconnected, the inverter neutral point Ni is invariable. However since a current does not flow in the disconnected coil, the voltage of the motor neutral point Nm varies. That is to say, if the voltage of the disconnected phase is positive, the voltage of the motor neutral point Nm is negative and if the voltage of the disconnected phase is negative, the voltage of the motor neutral point Nm is positive.

As a result, a differential voltage is created between the motor neutral point Nm and the inverter neutral point Ni and a corresponding signal current is input into the PWM signal generating circuits 26 through the low pass filter 25. The PWM signal is corrected in the summing amplifier 29 in response to the signal current.

For example, when the potential of the motor neutral point Nm is lower than the potential of the inverter neutral point Ni, the summing amplifier 29 corrects the signal by offsetting the triangular wave in a positive direction. As a result, the duty ratio of the affirmative PWM signal output from the comparator 30 increases and the duty ratio of the negative PWM signal output from the inverting amplifier 31 decreases. Therefore the total voltage at the motor neutral point Nm rises.

When the potential of the motor neutral point Nm is higher than the potential of the inverter neutral point Ni, the summing amplifier 29 corrects the signal by offsetting the triangular wave in a negative direction. As a result, the duty ratio of the affirmative PWM signal output from the comparator 30 decreases and the duty ratio of the negative PWM signal output from the inverting amplifier 31 increases. Therefore the total voltage at the motor neutral point Nm is reduced.

In the above manner, it is possible to compensate the torque that was generated by a disconnected coil with torque generated by other coils with the above negative feedback control. Thus it is possible to suppress the generation of noise and vibrations and fluctuations in torque due to disconnection.

It is possible to use a capacitor or a resistor as the impedance components Z1–Z12 used in the inverter neutral point voltage detecting circuit 23. Thus use of capacitors as the impedance components allows for DC current components to be eliminated by the capacitors and thus only the variable components of the current are detected. When capacitors are used as the impedance components, it is possible to omit the capacitor C1 used to cut out noise. In this event, the resistor Ri takes a relatively small value. As a result, the capacitor and the resistor Ri constitute a high pass filter with a time constant RC.

In this case, only the components passed through the both filters are fed back to the PWM signal generating circuits 26.

Figure 2:
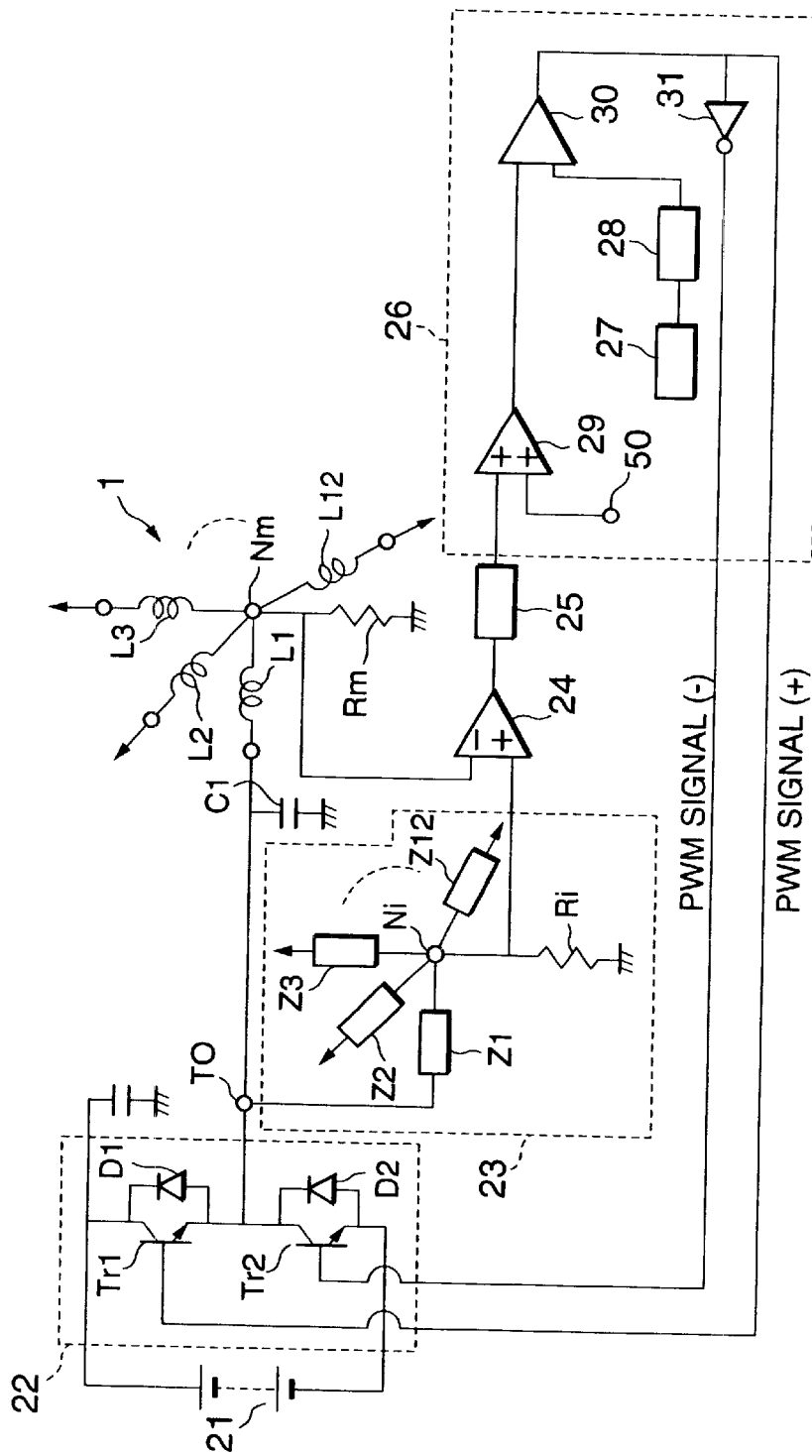
FIG. 2 is similar to FIG. 1, but showing a second embodiment of this invention.

FIG. 2 shows a second embodiment of this invention with respect to the components of the PWM signal generating circuit 26.

This embodiment only differs from the first embodiment with respect to the structure of the PWM signal generating circuit 26 and is similar in all other respects.

The summing amplifier 29 in the PWM signal generating circuit 26 adds the target voltage to the differential voltage of the inverter neutral point Ni and the motor neutral point Nm which are applied through the low pass filter 25. The comparator 30 compares the output signal of the summing amplifier 29 with the triangular carrier signal and generates the PWM signals.

Figure 3:
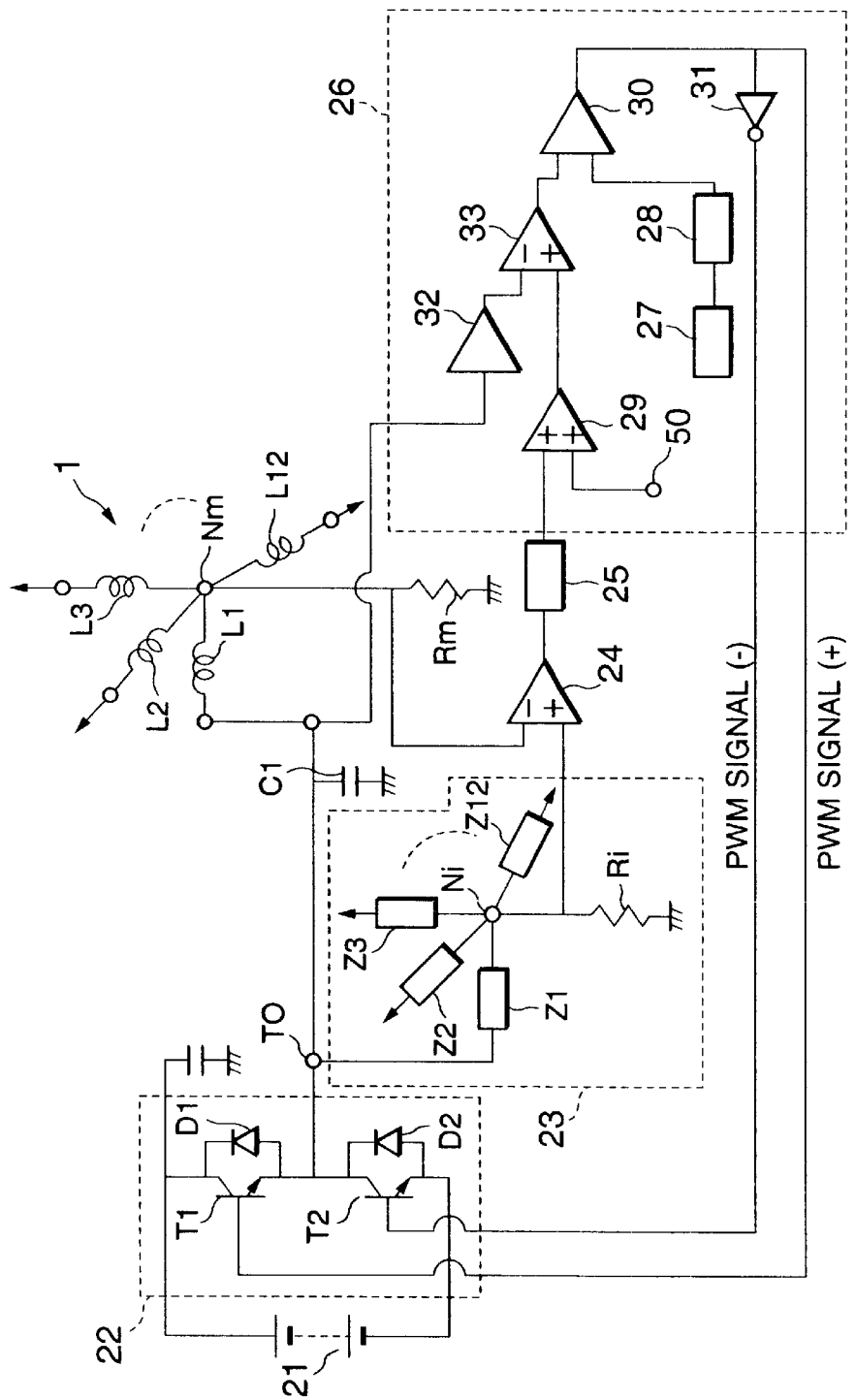
FIG. 3 is similar to FIG. 1, but showing a third embodiment of this invention.

FIG. 3 shows a third embodiment of this invention.

In the third embodiment, a buffer 32 and a differential amplifier 33 are added to the PWM signal generating circuit 26 of the second embodiment.

In this embodiment, the voltage of currents output from the inverter 22 to the coils L1–L12 is input to the differential amplifier 33 through the buffer 32. The differential amplifier 33 outputs a differential voltage of this input voltage and the output voltage from the summing amplifier 29 to the comparator 30. The comparator 30 compares the differential voltage with the triangular carrier signal output by the carrier signal generator 28 and thus creates a PWM signal. The buffer 32 and the differential amplifier 33 are provided for each coil L1–L12 in the same manner as the other components of the PWM signal generating circuit 26. The other components of the PWM signal generating circuit 26 are identical to those of the second embodiment.

The output torque of the motor/generator 1 is more accurately controlled by the feedback of the output voltage of the inverter 22 in the generation of the PWM signal.

FIG. 4 shows a fourth embodiment of this invention.

In this embodiment, a resistor R1 and a differential amplifier 34 are provided in place of the buffer 32 in the third embodiment.

Current-detecting resistors R1–R12 are respectively disposed between the coils L1–L12 and the output terminals TO of each phase in the inverter 22. The potential difference of both ends of the resistors R1–R12 is detected by the differential amplifier 34 and the potential difference is input into the differential amplifier 33. The differential amplifier 33 outputs a differential voltage of the potential difference and the output voltage of the summing amplifier 29 to the comparator 30 in the same manner as the third embodiment. The differential amplifier 33 is provided for each coil L1–L12.

Further, in this embodiment, a voltage signal corresponding to a target current is input into the target voltage input terminal 50.

Other aspects of the drive circuit are identical to those of the third embodiment.

With the above arrangement, the output current of the inverter 22 is fed back in the generation of the PWM signal and the output torque of the motor/generator can be accurately controlled in the same manner as the third embodiment.

Figure 5:
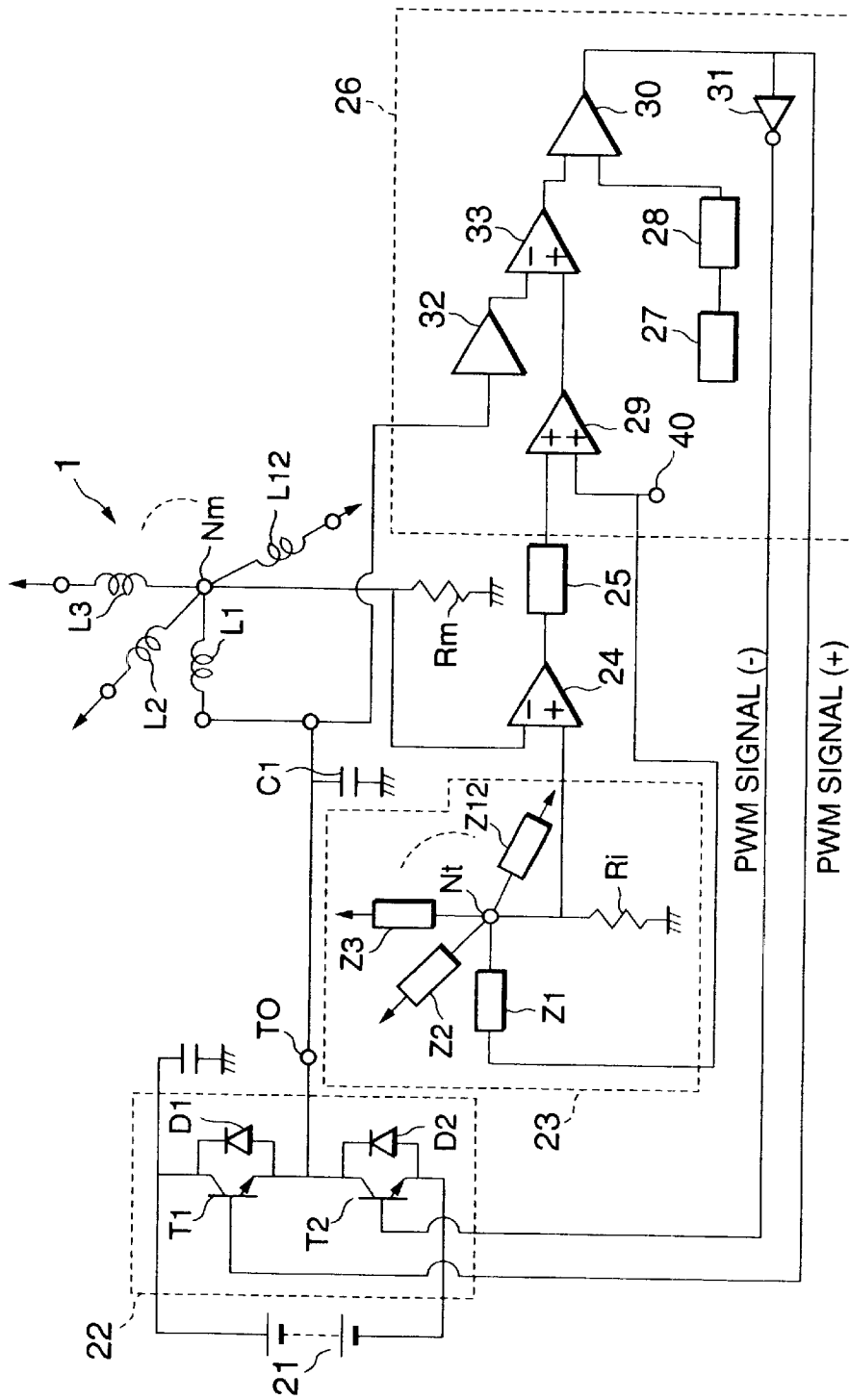
FIG. 5 is similar to FIG. 1, but showing a fifth embodiment of this invention.

A fifth embodiment of this invention will be described with reference to FIG. 5.

In this embodiment, the inverter neutral point voltage detecting circuit 23 detects the potential of the neutral point Nt of the target voltage of current of each phase instead of measuring the potential of the inverter neutral point Ni.

For this purpose, one end of each impedance component Z1–Z12 of the inverter neutral point voltage detecting circuit 23 is respectively connected to the target voltage input terminal 50 of each of the PWM signal generation circuits 26. The other end of each impedance component Z1–Z12 is connected to the neutral point Nt by a star connection. The neutral point Nt is earthed through the resistor Ri.

The voltage of the motor neutral point Nm and the voltage of the neutral point Nt are input into the differential amplifier 24. The other components of the drive circuit are identical to those of the third embodiment.

The above arrangement allows the potential detected by the inverter neutral point voltage detecting circuit 23 to be the potential which should appear in the inverter neutral point Ni when the inverter 22 is functioning normally and not the actual potential of the inverter neutral point Ni.

The potential of the inverter neutral point Ni and the motor neutral point Nm fluctuate together when a component of the inverter 22 such as a transistor is malfunctioning or when an abnormality occurs in the output of the inverter unit which has a malfunctioning transistor. On the other hand, the potential of the neutral point Nt detected by the inverter neutral point voltage detecting circuit 23 according to this embodiment is not affected by abnormalities in the output of the inverter unit.

Thus in this embodiment, even when a component of the inverter 22 is malfunctioning, it is possible to control the inverter 22 so that the abnormal output of the relevant inverter unit can be compensated and torque fluctuations in the motor/generator 1 can be suppressed.

Instead of calculating a voltage at the neutral point Nt by an analogue circuit as described above, it is possible to calculate a potential at the neutral point Nt by an arithmetic calculation based on each phase of the target voltage. That is to say, a target voltage for each phase is calculated by a microprocessor for example.

In this case, the sum of the target voltages is converted to an analogue signal and input into the differential amplifier 24.

Figure 6:
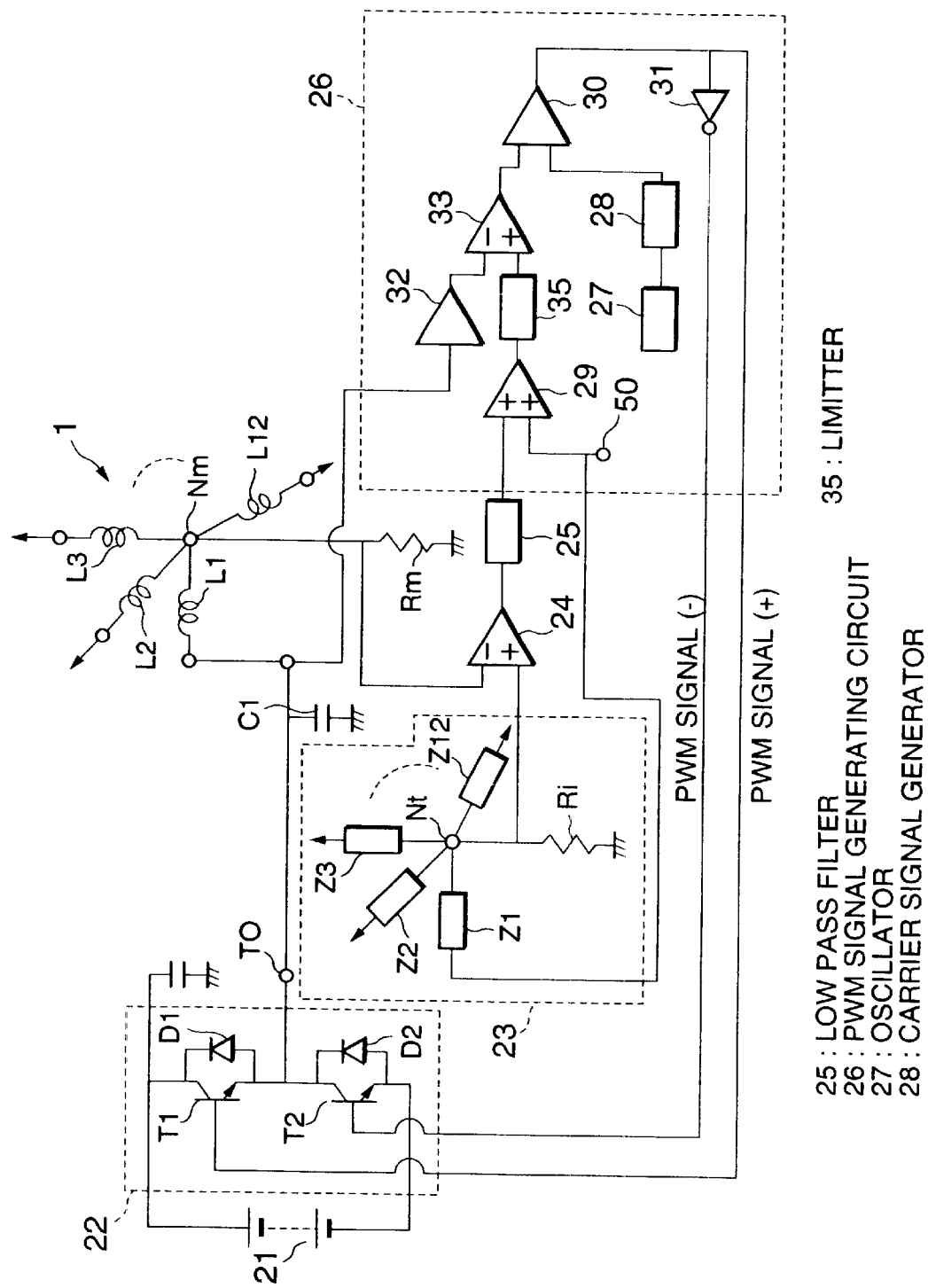
FIG. 6 is similar to FIG. 1, but showing a sixth embodiment of this invention.

A sixth embodiment of this invention will be described with reference to FIG. 6.

In this embodiment, a limiter 35 is provided between the differential amplifier 33 and the summing amplifier 29 of the PWM signal generating circuit 26 of the fifth embodiment.

The limiter 35 limits the output voltage of the summing amplifier 29. In this case, the output voltage is limited to less than a pre-set upper limiting value or the variation speed of the output voltage, that is to say, the time constant is limited to less than a fixed value. The other components are identical to those of the fifth embodiment.

In this embodiment, rapid increases in the output of the summing amplifier 29 are suppressed and it is possible to stabilize the control of the inverter 22. Even when the output of the summing amplifier 29 is limited by the limiter 35, the deficiency in the torque corresponding to the output limit is compensated for by other inverter units and thus the output torque of the motor/generator is not affected.

The limiter 35 may be applied to the PWM signal generating circuit 26 of the first to the fourth embodiments.

Figure 7:
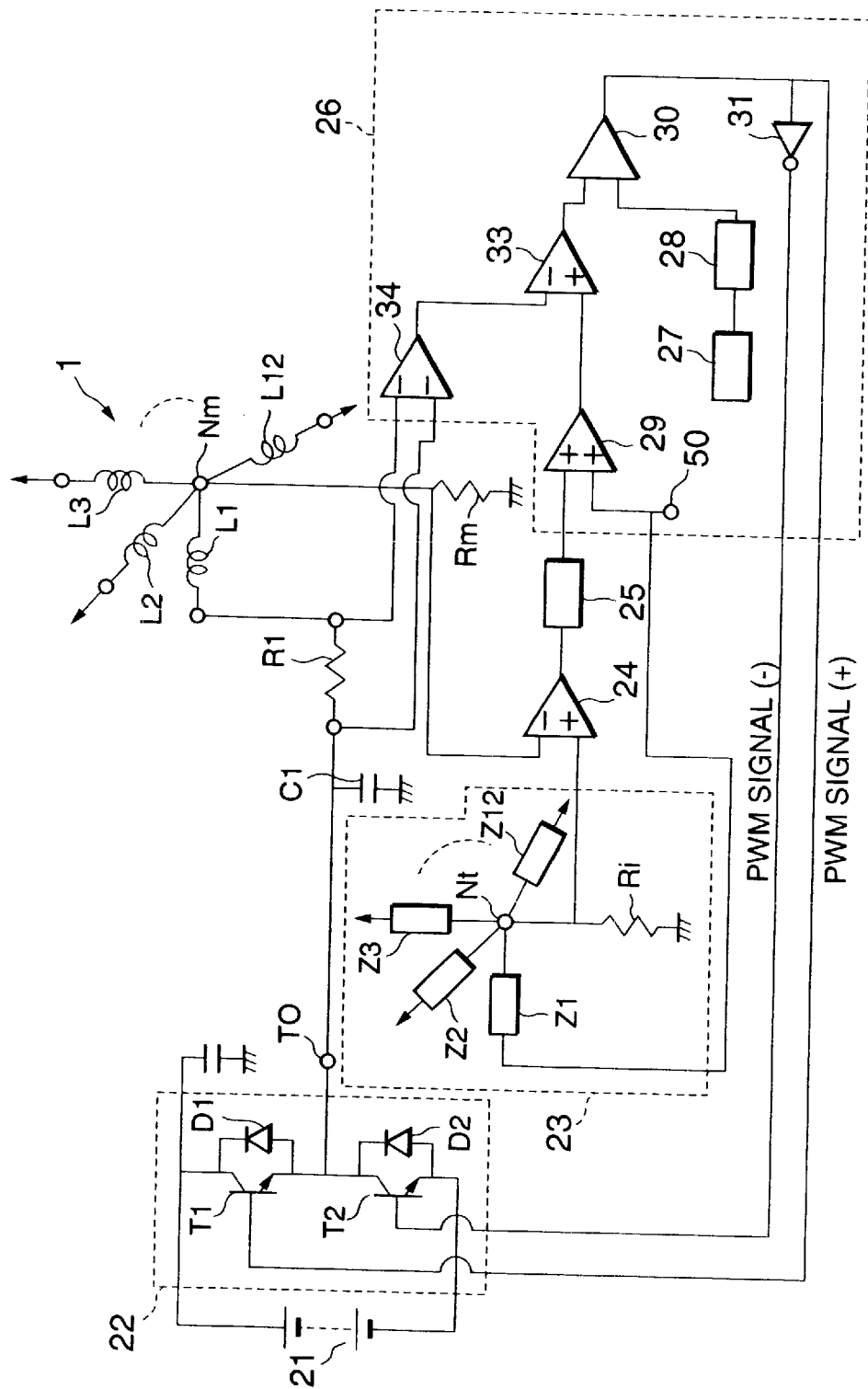
FIG. 7 is similar to FIG. 1, but showing a seventh embodiment of this invention.

A seventh embodiment of this invention will be described with reference to FIG. 7. This embodiment corresponds to a combination of the fourth and fifth embodiments.

That is to say, the inverter neutral voltage detecting circuit 23 detects the potential of the neutral point Nt of the target voltage. Each of the PWM signal generating circuits 26 controls the PWM signal based on the differential voltage of the motor neutral points Nm and Nt, and the output current of the inverter 22.

In any one of the first to third embodiments, it is possible to compensate malfunctions of the inverter 22 by causing the inverter neutral voltage detecting circuit 23 to detect the potential of the neutral point Nt of the target voltage.

Figure 8:
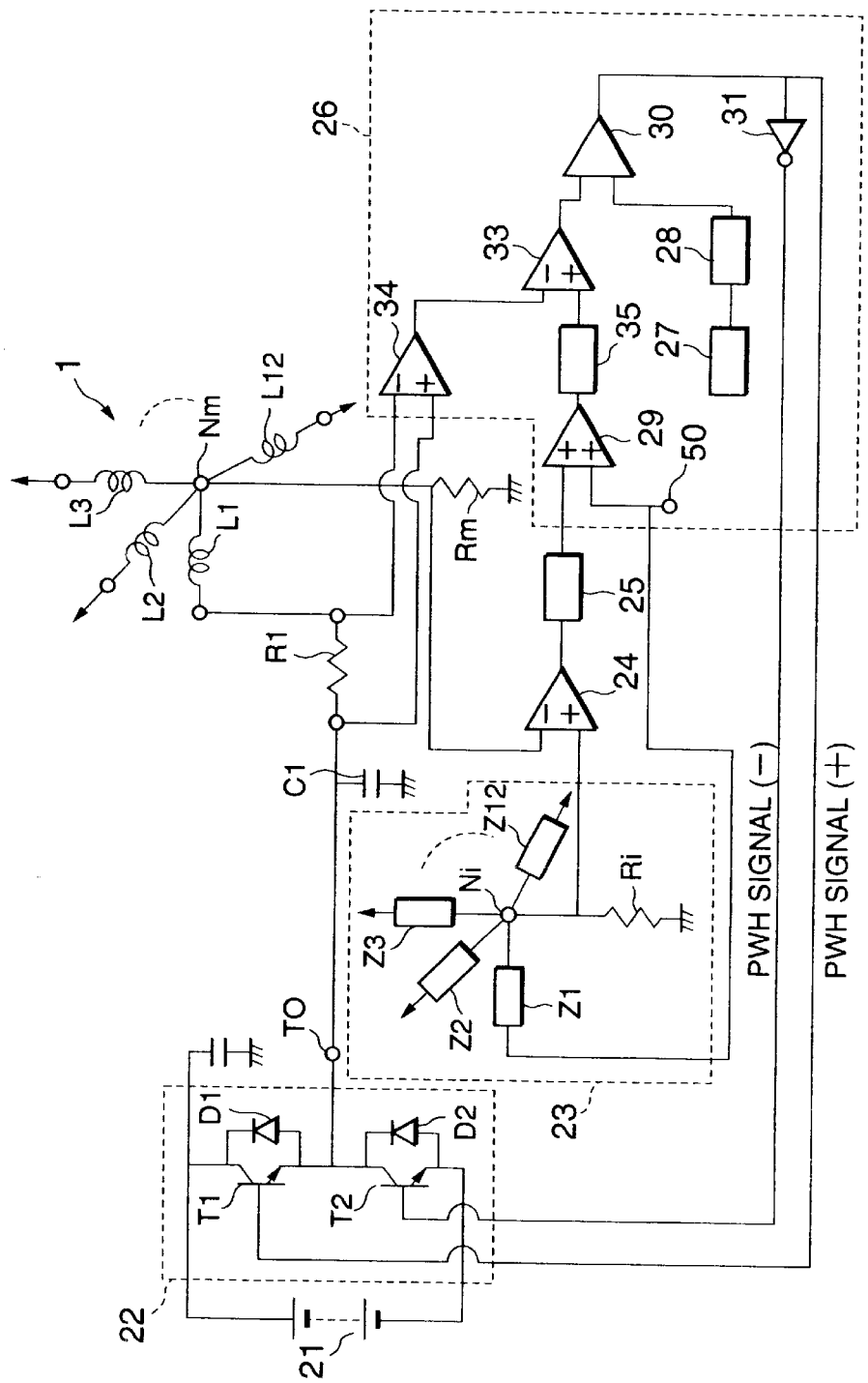
FIG. 8 is similar to FIG. 1, but showing an eighth embodiment of this invention.

An eighth embodiment of this invention will be described with reference to FIG. 8.

In this embodiment, a limiter 35 is provided between the differential amplifier 33 and the summing amplifier 29 of the PWM signal generating circuit 26 of the seventh embodiment. This embodiment allows a plurality of effects to be realized at the same time. These effects include improvements in the control accuracy of the inverter 22 according to the fourth embodiment, compensation of malfunctioning of the inverter 22 according to the fifth embodiment, and stabilization of the control of the inverter 22 according to the sixth embodiment.

A ninth embodiment of this invention will be described with reference to FIGS. 9A–11B.

In this embodiment, the construction of the motor/generator is different from the motor/generator applied in the first to eighth embodiments.

Figure 9A:
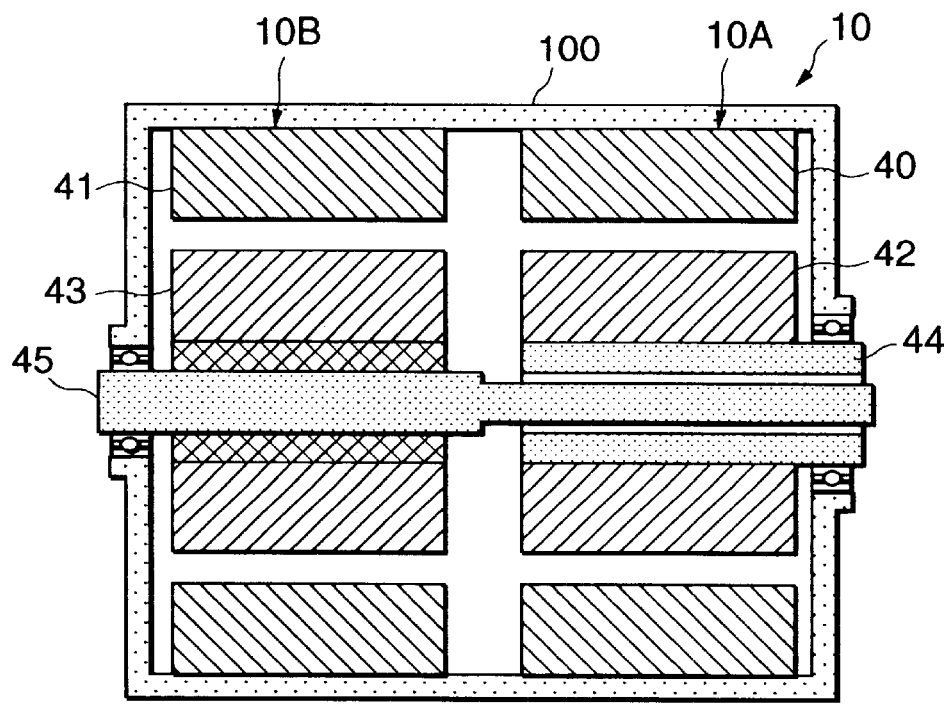
FIG. 9A and FIG. 9B are a schematic sectional views of a motor/generator driven by a drive circuit according to a ninth embodiment of this invention.
Figure 9B:
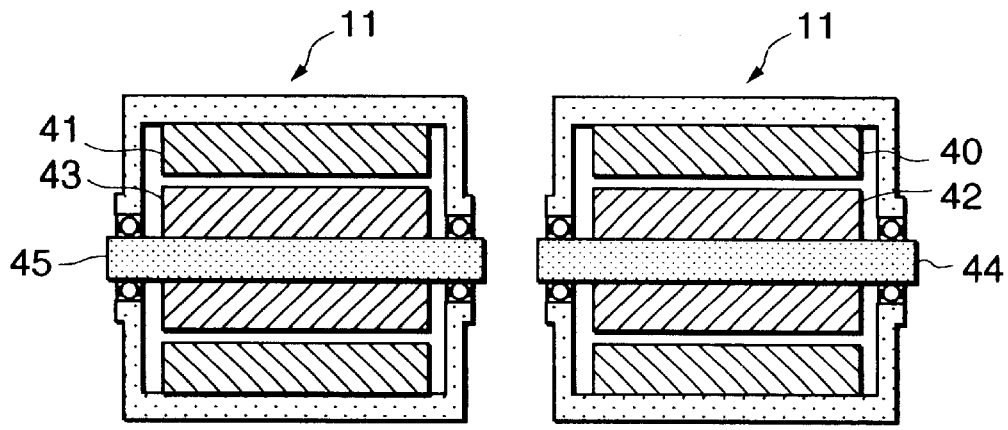

The drive circuit according to this embodiment drives a motor/generator 10 comprising two stators 40, 41 and two rotors 42, 43 as shown in FIG. 9A, or two motor/generators 11 each having a single rotor 42(43) and a single stator 40(41) as shown in FIG. 9B.

The motor/generator 10 shown in FIG. 9A comprises a right motor/generator unit 10A and a left motor/generator unit 10B in a single case 100. The right motor/generator unit 10A is provided with a right rotor 42, a right stator 40 and a right rotation shaft 44. The left motor/generator unit 10B is provided with a left rotor 43, a left stator 40 and a left rotation shaft 45.

The right rotation shaft 44 is in a form of a hollow shaft and the left rotation shaft 45 co-axially penetrates through the right rotation shaft 44. The right rotor 42 and the left rotor 43 are respectively provided with magnets. Twelve coils are respectively provided in the right stator 40 and in the left stator 41 to respectively form a rotating magnetic field. However the number of pairs of magnetic poles in the right motor/generator unit 10A differs from the number of those in the left motor/generator unit 10B. Herein a pair of magnetic poles denotes a pair of an N pole and S pole.

The right rotor 42 and right stator 40 are constructed so that a magnetic field having four pairs of magnetic poles is formed by supplying a three-phase alternating current to the coils in the stator 40.

The left rotor 43 and left stator 41 are constructed so that a magnetic field having three pairs of magnetic poles is formed by supplying a four-phase alternating current to the coils in the stator 41.

The motor generators 11 shown in FIG. 9B correspond to the motor/generator 10 divided into two portions.

Each motor/generator 11 is provided with a rotor 42(43), a stator 41(42) and a rotation shaft 44(45). The rotor 42 (43) is provided with a magnet and the stator 40(41) is provided with twelve coils.

The two motor/generators 11 have a different number of pairs of magnetic poles in the same manner as the left motor/generator unit 10A and the left motor/generator unit 10B of FIG. 9A. The motor/generator 11 on the right side of the figure forms a rotating magnetic field having four pairs of magnetic poles by supplying a three-phase alternating current due to the same arrangement as the left motor/generator unit 10A. The motor/generator 11 on the left side of the figure forms a rotating magnetic field having three pairs of magnetic poles by supplying a four-phase alternating current due to the same arrangement as the left motor/generator unit 10B.

Figure 10A:
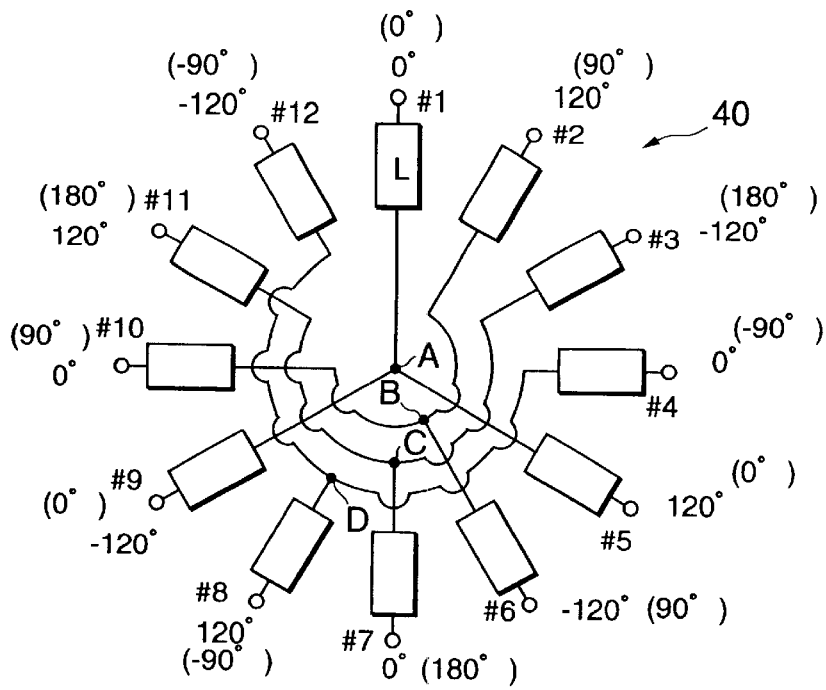
FIGS. 10A and 10B are circuit diagrams of the connections of the coils in the motor/generator shown in FIG. 9A and FIG. 9B.

The right motor/generator unit 10A shown in FIG. 9A and the right motor/generator 11 shown in FIG. 9B connect the coils L1–L12 of the stator 40 as shown in FIG. 10A. That is to say, the coils L1–L12 are divided into a first group comprising the coils L1, L5, L7 which are star-connected about the neutral point A, a second group comprising the coils L2, L6, L10 which are star-connected about the neutral point B, a third group comprising the coils L3, L7, L11 which are star-connected about the neutral point C, and a fourth group comprising the coils L4, L8, L12 which are star-connected about the neutral point D. A three-phase alternating current is supplied to each of these groups. The numbers #1–#12 in the figure represents an input terminal of the coils L1–L12 to which an output current of the inverter 22 is supplied.

Figure 10B:
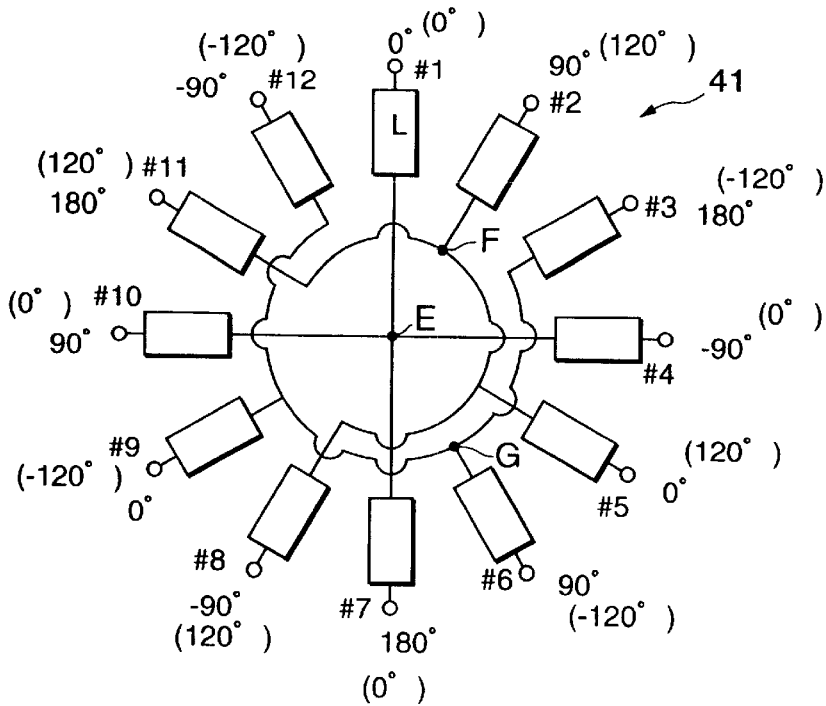

The left motor/generator unit 1B in FIG. 9B and the motor/generator 11 shown on the left of FIG. 9B connect the coils L1–L12 of the stator 41 as shown in FIG. 10B. That is to say, the coils L1–L12 are divided into a first group comprising the coils L1, L4, L7, L11 which are star-connected about the neutral point E, a second group comprising the coils L2, L5, L8, L11 which are star-connected about the neutral point F, and a third group comprising the coils L3, L6, L9, L12 which are star-connected about the neutral point G. A four-phase alternating current is supplied to each of these groups. The numbers #1–#12 in the figure represents an input terminal to which an output current of the inverter 22 is supplied.

When the motor/generator 10 is formed as above, it is possible to use one motor/generator unit 10A(10B) to drive front wheels of the vehicle and the other motor/generator unit 10B(10A) to drive the rear wheels. The two independent motor/generators 11 may also be used to respectively drive the front wheels and rear wheels of the vehicle.

Figure 11A:
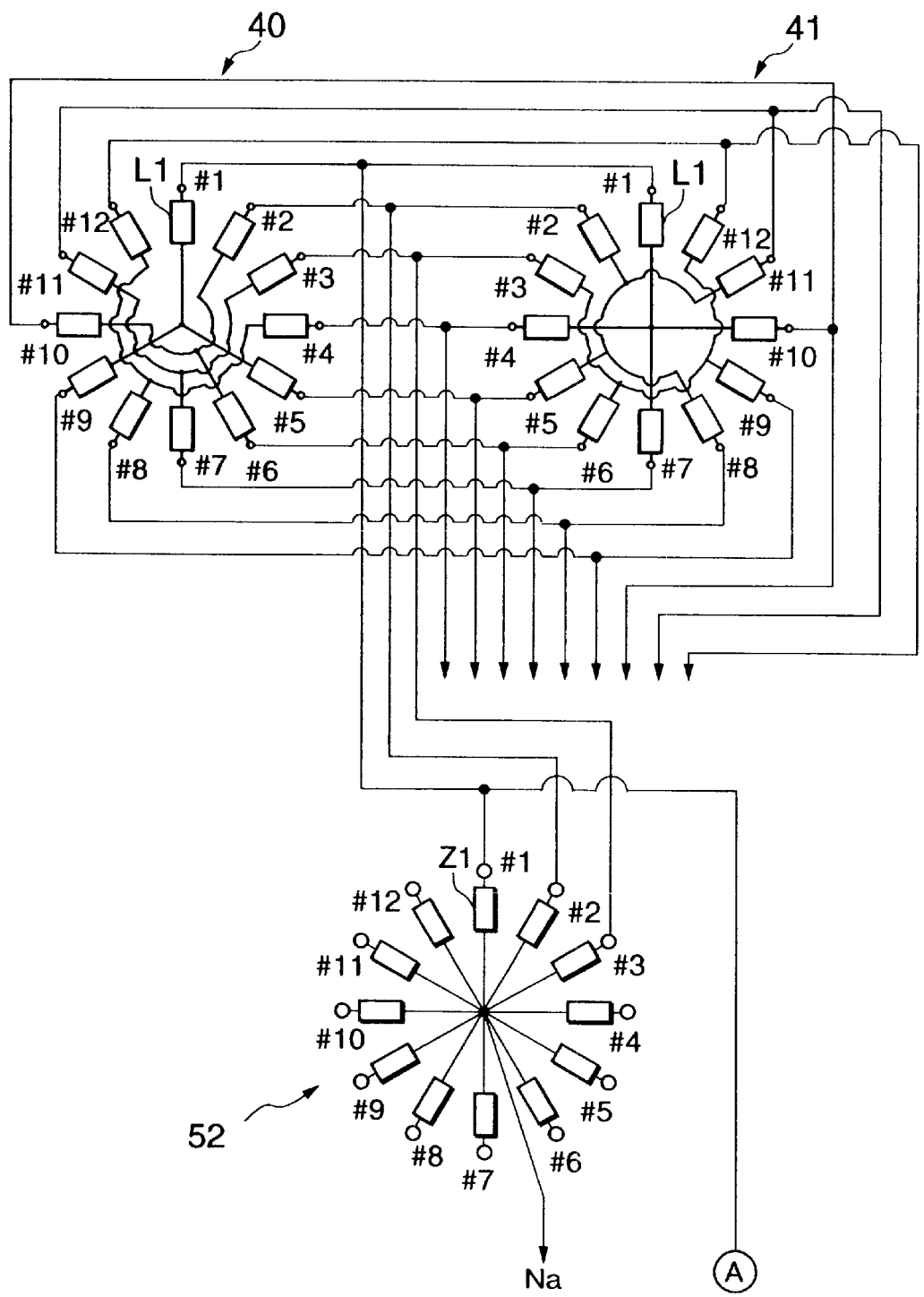
FIGS. 11A and 11B are circuit diagrams of a drive circuit according to a ninth embodiment of this invention.
Figure 11B:
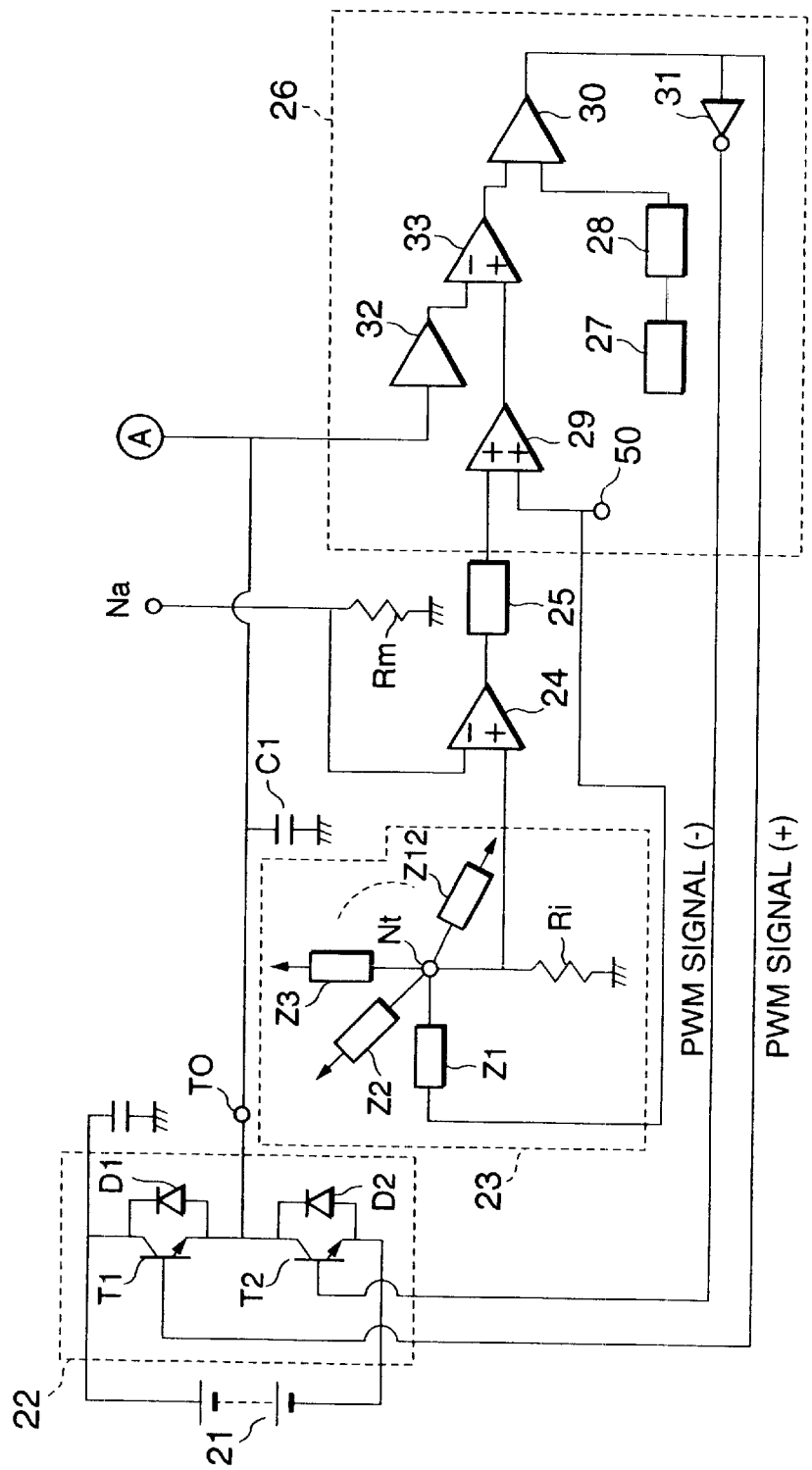

Referring now to FIGS. 11A and 11B, the supply of current to the coils L1–L12 of the stator 40 shown in FIG. 10A and to the coils L1–L12 of the stator 41 shown in FIG. 10B will be described.

The coils L1–L12 of the stator 40 and the coils L1–L12 of the stator 41 are connected in parallel to the total of twelve output terminals TO of the inverter 22.

That is to say, the coil L1 of the stator 40 and the coil L1 of the stator 41 are connected in parallel to the output terminal TO of the corresponding inverter unit. Although not shown in the figures, each pair of the coils L2–L12 having the same number in FIG. 11A are connected in parallel to the output terminal TO of the corresponding inverter unit in the same manner.

Although the stators 40, 41 are provided with the same number of coils L1–L12, the number of pairs of magnetic poles formed by the coils L1–L12 differs. In the stator 40 which forms four pairs of magnetic poles, an alternating current with a phase difference of 120 degrees flows in the three coils which share the neutral point. In the stator 41 which forms three pairs of magnetic poles, an alternating current with a phase difference of 90 degrees flows in the four coils which share the neutral point.

Referring again to FIG. 10A, the phase of the alternating current waveform of each terminal of the coils L1, L5, L9 of the stator 40 is 0 degrees, 120 degrees and −20 degrees.

On the other hand, the alternating current waveform of each terminal of the coils L1, L5, L9 of the stator 41 are all 0 degrees as shown in FIG. 10B. That is to say, the alternating current for driving the rotor 42 exerts no force on the rotor 43. Referring now to FIG. 10B, the phase of the alternating current waveform of each terminal of the coil L1, L4, L7, L10 of the stator 41 is 0, −90, 180, 90 degrees.

On the other hand, the phase of the alternating current waveform of each terminal of the coils L1, L4, L7, L10 of the stator 40 are all 0 degrees as shown in FIG. 10A. That is to say, the alternating current for driving the rotor 43 exerts no force on the rotor 42.

That is to say, due to the connection shown in FIGS. 11A and 11B, only the current components required to form the rotating magnetic field which drives the rotor 42 is applied to the coils L1–L12 of the stator 40. Only the current components required to form the rotating magnetic field which drives the rotor 43 is applied to the coils L1–L12 of the stator 41. Thus it is possible to prevent increases in heat generation or copper loss as an ineffective current does not flow in any of the coils.

The above conditions are established when the number of pairs of magnetic poles of the two motors differs and the electrical pole number of the coils of the stators in the two motors are the same. Herein, the electrical pole number of the coils means the multiple of the phase number of the AC current and the number of pairs of magnetic poles.

Considering the above conditions, it is possible to combine a three-phase motor with four pairs of magnetic poles with a six-phase motor with two pairs of magnetic poles, a three-phase motor with five pairs of magnetic poles with a five-phase motor with three pairs of magnetic poles, a three-phase motor with six pairs of magnetic poles with a six-phase motor with three pairs of magnetic poles, and a four-phase motor with six pairs of magnetic poles with a six-phase motor with four pairs of magnetic poles.

In the motors as represented by the above examples, only a current which is in phase with the respective motors flows in each motor, even when the corresponding terminals of the two motors are connected in parallel to the output terminal TO of the inverter. Thus even when a current is supplied to the two motors from a single inverter, the motor/generator can be driven effectively in the same manner as when a current from independent inverter circuits is supplied to each motor.

In this embodiment, the invention is applied to a pair of a four-phase current stator 41 which has three pairs of magnetic poles and a three-phase current stator 40 which has four pairs of magnetic poles which have the above relationship. The coils L1–L12 of the stator 40 have four neutral points and the coils L1–L12 of the stator 41 have three neutral points.

The input terminal #1 which is positioned opposite the neutral point of the coil L1 of the stator 40 and the input terminal #1 which is positioned opposite the neutral point of the coil L1 of the stator 41 are connected in parallel to one end of the impedance component Z1 of a neutral point voltage detecting circuit 52 and the output terminal TO of the inverter 22. In the same manner, The input terminal #2–#12 which is positioned opposite the neutral point of the coils L2–L12 of the stator 40 and the input terminal #2–#12 of the corresponding coils L2–L12 of the stator 41 are connected in parallel to one end of the impedance components Z2–Z12 of the neutral point voltage detecting circuit 52 and the output terminal TO of the inverter 22. The other end of each of the impedance components Z2–Z12 is connected to the neutral point Na by a star connection.

A plurality of neutral points exists in each of the stators 40, 41. Thus it is not possible to detect a neutral point potential with the method as applied in the first–eighth embodiments. However, it is still possible to compensate a malfunction in the inverter units or a disconnection in the cables connecting the output terminals TO of the inverter units and the input terminals #1–#12 of the coils L1–L12. by providing the neutral point voltage detecting circuit 52.

A drive circuit which supplies current to the stators 40, 41 will now be described. The inverter 22, the inverter neutral point voltage detecting circuit 23, the differential amplifier 24, the low pass filter 25, the PWM signal generating circuit shown in FIG. 11B are the same as those described in the fifth embodiment.

However the voltage of the neutral point Na of the neutral point voltage detecting circuit 52 is input to the differential amplifier 24 instead of the voltage of the motor neutral point Nm as described in the fifth embodiment. In the same manner as the fifth embodiment, the voltage of the current input to the coils L1–L12 is input to the differential amplifier 33 through the buffer 32 from the input terminals #1–#12 of the coils L1–L12 of the stators 40, 41.

In this embodiment also, it is possible to detect the potential of the neutral point Nt by an arithmetic calculation based on the target voltage of each phase instead of using an analogue circuit. That is to say, by summing the target voltage of each phase by a microprocessor for example, the instantaneous voltage is calculated, the calculated instantaneous voltage is then converted to an analogue voltage and input into the differential amplifier 24.

Figure 12:
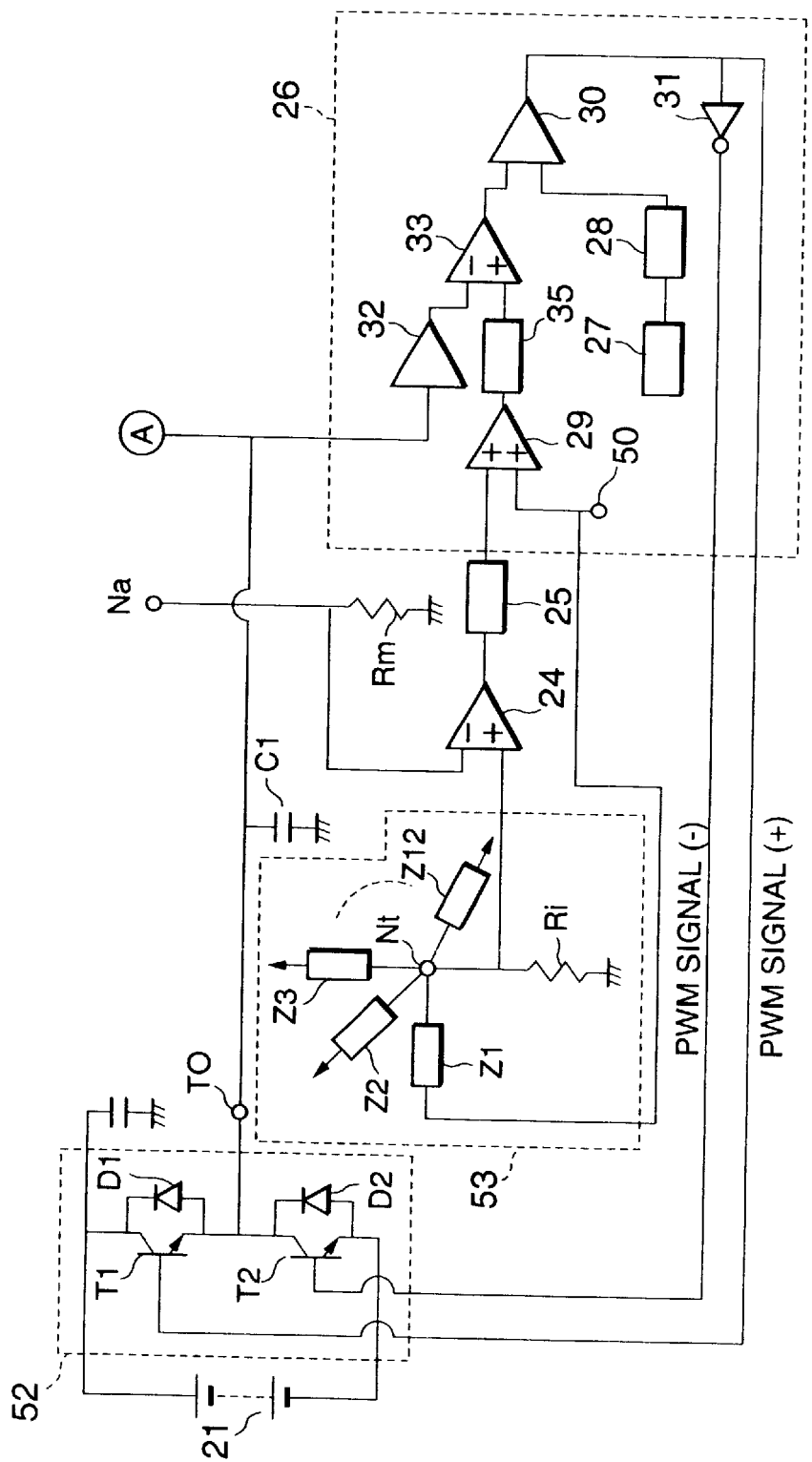
FIG. 12 is similar to FIG. 11B, but showing a tenth embodiment of this invention.

A tenth embodiment of this invention will be described with reference to FIG. 12.

In this embodiment, the limiter 35 as in the sixth embodiment is provided between the differential amplifier 33 and the summing amplifier 29 of the PWM signal generating circuit 26 of the ninth embodiment. The other components are the same as those of the ninth embodiment. This embodiment allows further stabilization in the control of the inverter 22 in the ninth embodiment.

Figure 13A:
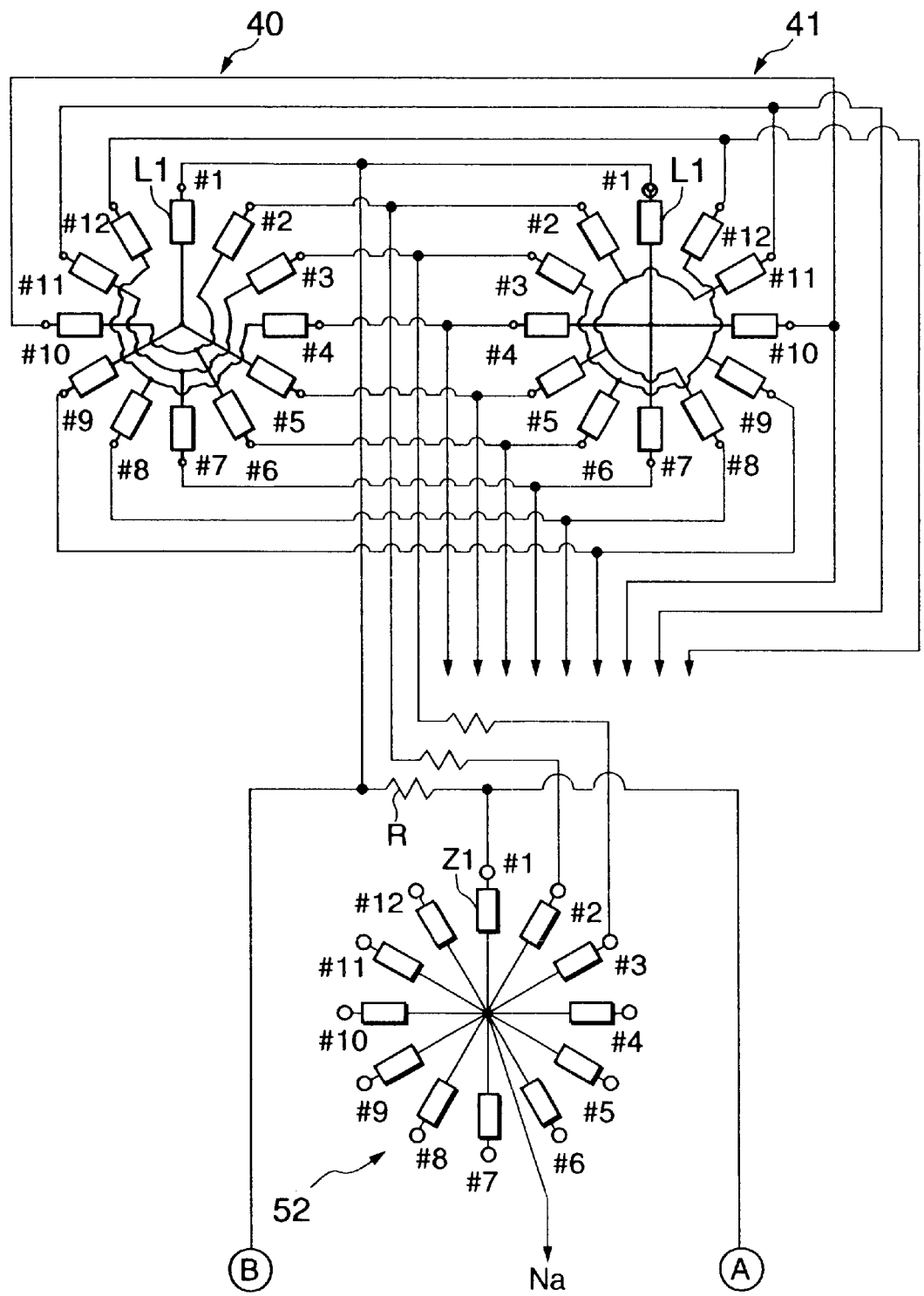
FIG. 13A and FIG. 13B are similar to FIGS. 11A and 11B, but showing an eleventh embodiment of this invention.
Figure 13B:
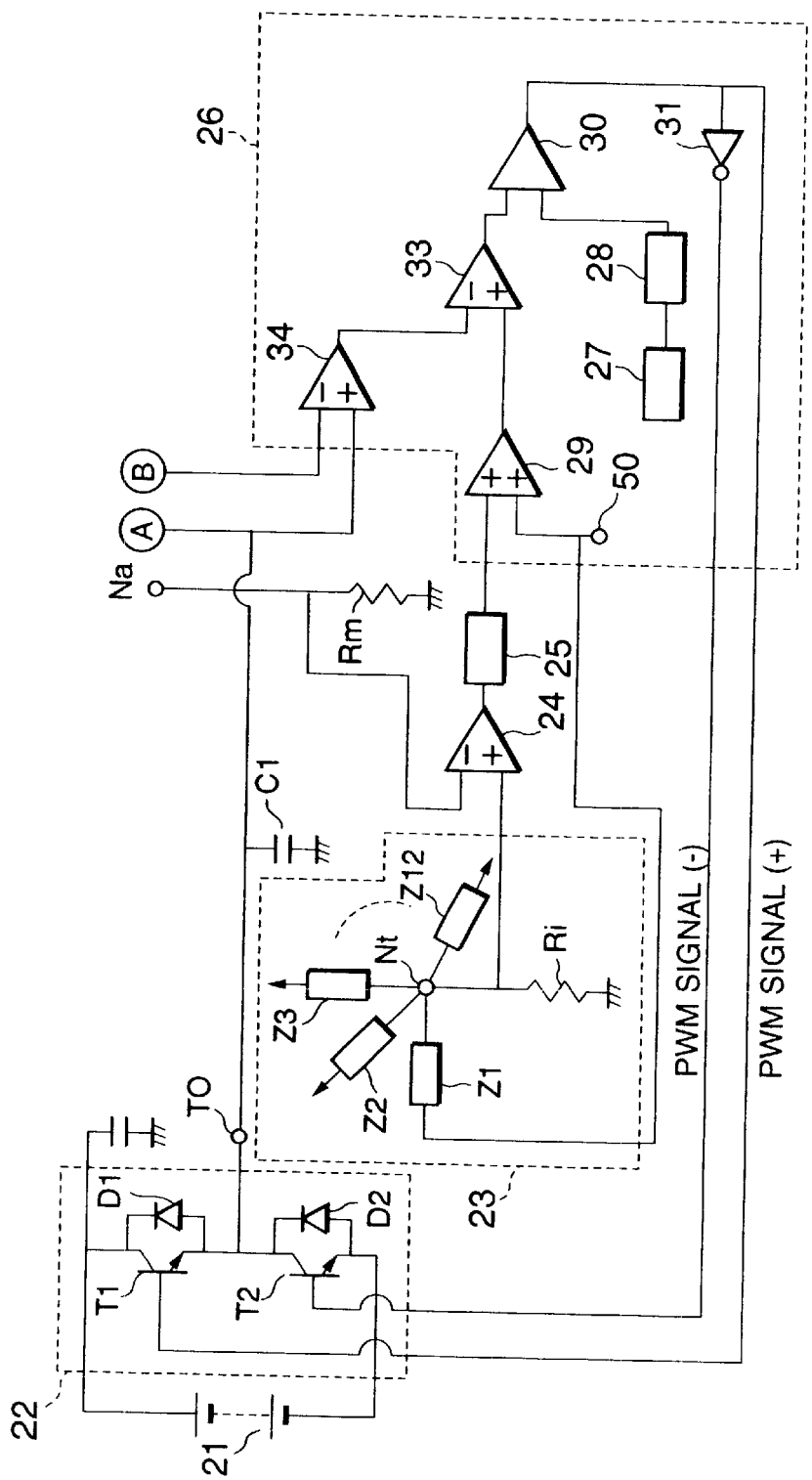

An eleventh embodiment of this invention will be described with reference to FIG. 13A and FIG. 13B.

In this embodiment, resistors R1–R12 for detecting current in the same manner as in the fourth embodiment are respectively disposed between the input terminals #1–#12 of the coils L1–L12 and the output terminals TO of the inverter 22 of the ninth embodiment. The potential difference of both ends of each of the resistors R1–R12 is detected by the differential amplifier 34 and the potential difference is input into the differential amplifier 33. The differential amplifier 33 outputs a differential voltage of the potential difference and the output voltage of the summing amplifier 29 to the comparator 30. The differential amplifier 33 is provided in each of the coils L1–L12. In other respects, the arrangement is the same as the ninth embodiment.

The above arrangement results in feedback of the output current of the inverter 22 to the generation of the PWM signal and allows accurate output control of the motor/generators 10, 11 as in the case of the fourth embodiment.

Figure 14:
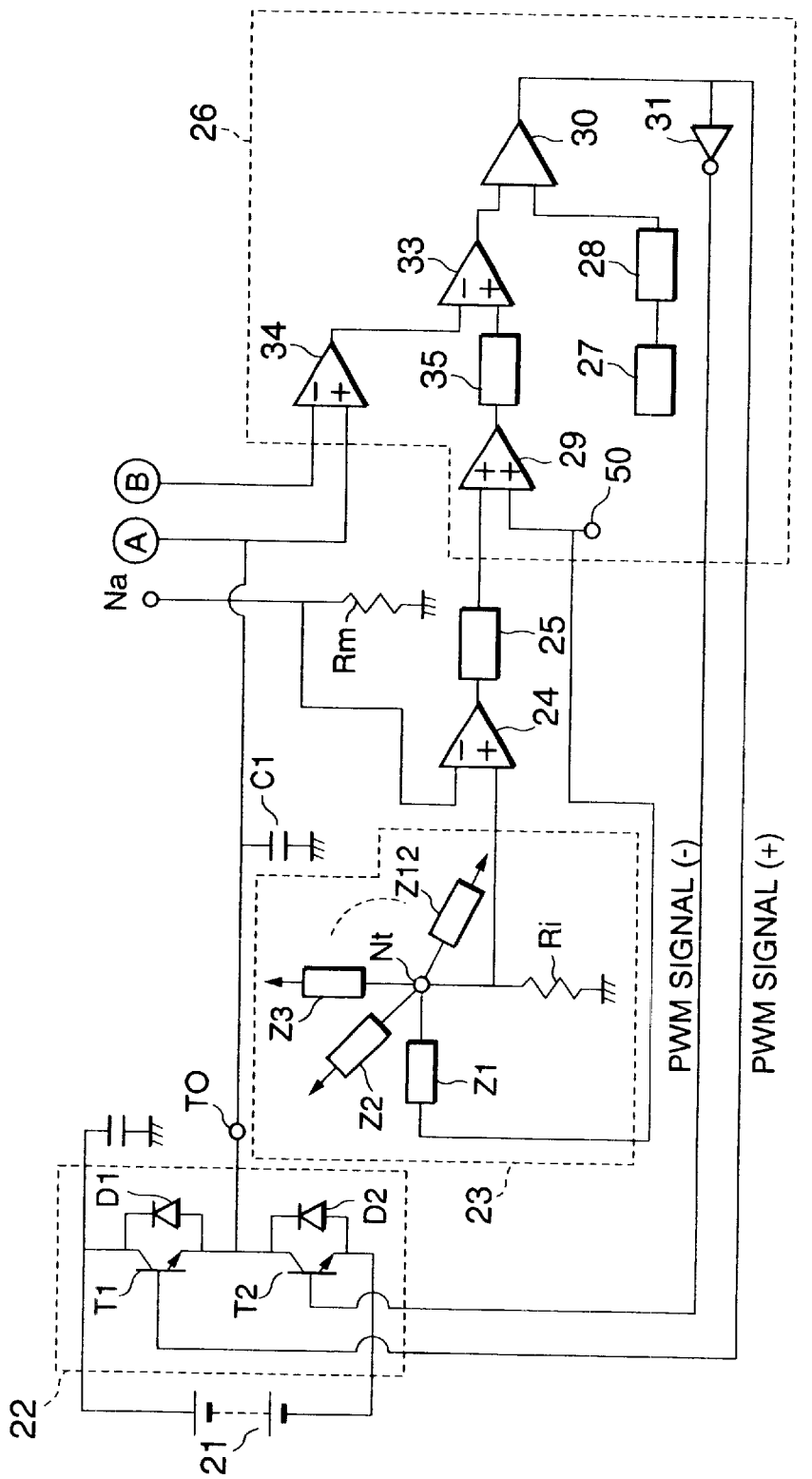
FIG. 14 is similar to FIG. 11B, but showing a twelfth embodiment of this invention.

A twelfth embodiment of this invention will be described with reference to FIG. 14.

In this embodiment, the limiter 35 is provided between the differential amplifier 33 and the summing amplifier 29 of the PWM signal generating circuit 26 of the eleventh embodiment. The other components are the same as those of the eleventh embodiment. This embodiment allows further stabilization in the control of the inverter 22 of the eleventh embodiment.

Figure 15A:
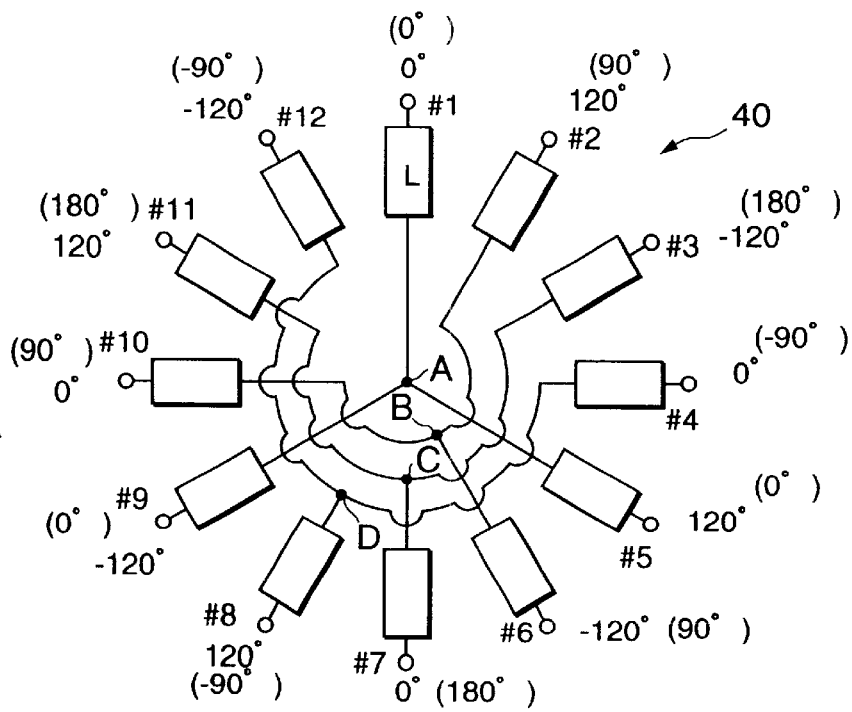
FIG. 15A and FIG. 15B are similar to FIGS. 10A and 10B, but showing a thirteenth embodiment of this invention.
Figure 15B:
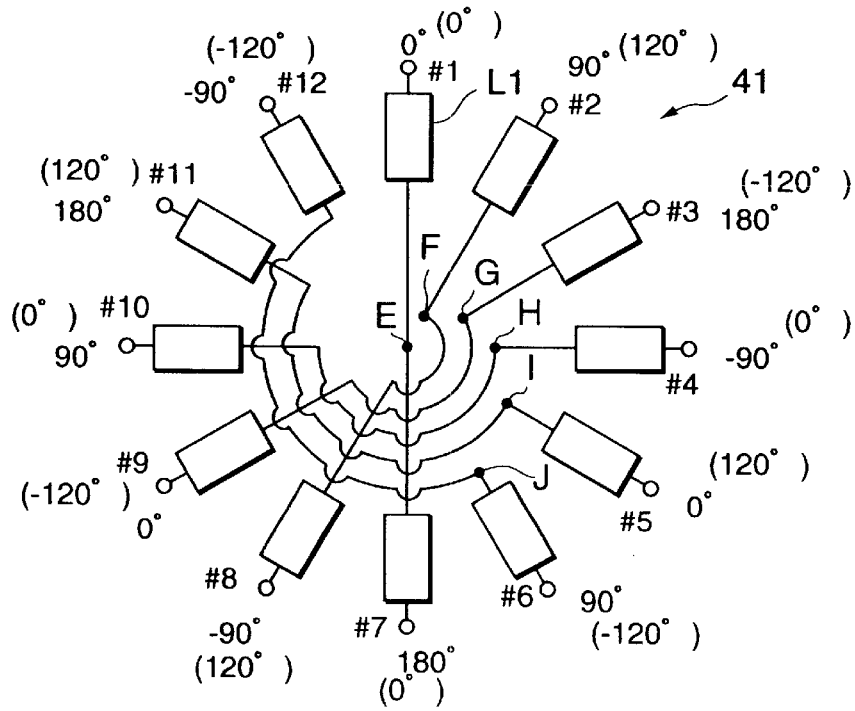

Referring to FIGS. 15A and 15B, a thirteenth embodiment of this invention regrading the connection of coils will be described.

This embodiment relates a motor/generator provided with a stator 40 forming four pairs of magnetic poles with a three-phase current and a stator 41 forming three pairs of magnetic poles with a four-phase current in the same manner as the ninth–twelfth embodiments.

However this embodiment differs from the ninth–twelfth embodiments with respect to the connection of the coils L1–L12 of the stator 41. That is to say, in the stator 41, as shown in FIG. 15B, two coils disposed at 180 degree intervals are connected with each other at six neutral points E–J.

For example, the coil L7 and the coil L1 are connected at the neutral point E. In the same manner, the coil L2 and the coil L8 are connected at the neutral point F, the coil L3 and the coil L9 are connected at the neutral point G, the coil L4 and the coil L10 are connected at the neutral point H, the coil L5 and the coil L11 are connected at the neutral point I and the coil L6 and the coil L12 are connected at the neutral point J.

The connection of the stator 40 shown in FIG. 15A is the same as that of the ninth–twelfth embodiment.

The angular values in FIG. 15A represent the phase of the current supplied to each coil L1–L12 of the stator 40 to drive the rotor 42. On the other hand, the angular values in the bracket in the figure represent the phase of the current supplied to each coil L1–L12 of the stator 40 when the stator 41 drives the rotor 43.

The angular values in FIG. 15B represent the phase of the current supplied to each coil L1–L12 of the stator 41 to drive the rotor 43. On the other hand, the angular values in the bracket in the figure represent the phase of the current supplied to each coil L1–L12 of the stator 41 when the stator 40 drives the rotor 42.

As can be understood from the figures, when the current is supplied to the coils L1–L12 of the stator 40 to drive the rotor 42, the current supplied to the coils L1 and L7 has a phase difference of zero degrees.

The same current is applied to the coils L1 and L7 of the stator 41 which are connected to each other via the neutral point E. Since the current applied to the coils L1 and the current to the coil L7 have no phase difference, no flow of current is formed between the coils L1 and L7 of the stator 41. On the other hand, when the current is supplied to the coils L1–L12 of the stator 41 to drive the rotor 43, the current supplied to the coils L1 and L7 has a phase difference of 180 degrees, so the current flows between the coils L1 and L7 via the neutral point E. Similarly, the current having a phase difference of 180 degrees is applied to the pair of coils L2 and L8, pair of the coils L3 and L9, pair of the coils L4 and L10, pair of the coils L5 and L11, and pair of the coils L6 and L12, and the current flows in these pairs of coils via the respective neutral points F, G, H, I, J. The same current is applied to the coils L1–L12 of the stator 40. In the stator 40, however, the phase of current applied to the coils L1, L5, L9 which are connected to each other via the neutral point A, has no phase difference as shown by the angular values in the bracket in FIG. 15A. Therefore, no flow of current is formed among these coils L1, L5, L9. The same is true for the other groups of coils in the stator 40.

In this motor/generator also, it is possible to suppress the generation of vibration, noise or torque fluctuation in a motor/generator with a malfunctioning inverter 22 or a disconnection in the cables connecting the output terminals TO of the inverter 22 and the input terminals #1–#12 of the coils L1–L12, by providing a drive circuit containing a neutral point voltage detecting circuit 52 as in the ninth to twelfth embodiments.

Figure 16A:
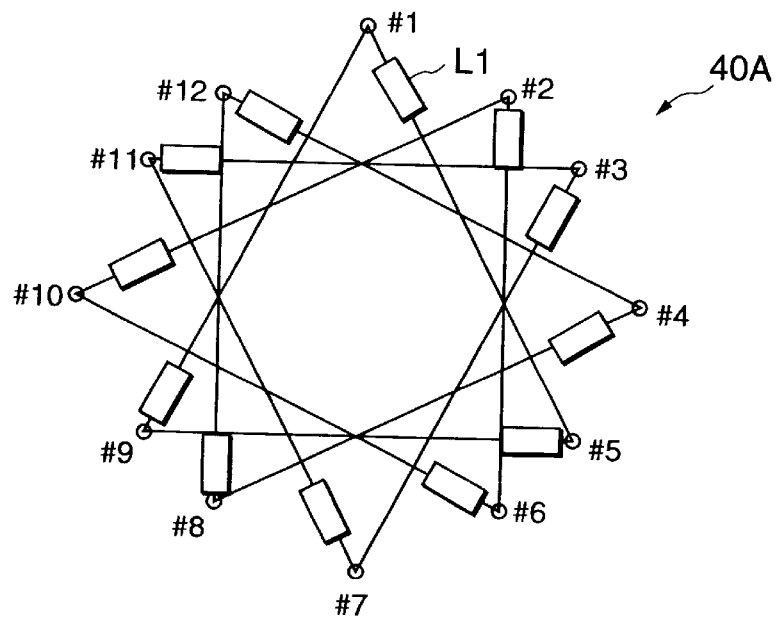
FIGS. 16A and 16B are circuit diagrams of the connections of the coils in a motor/generator according a fourteenth embodiment of this invention.
Figure 16B:
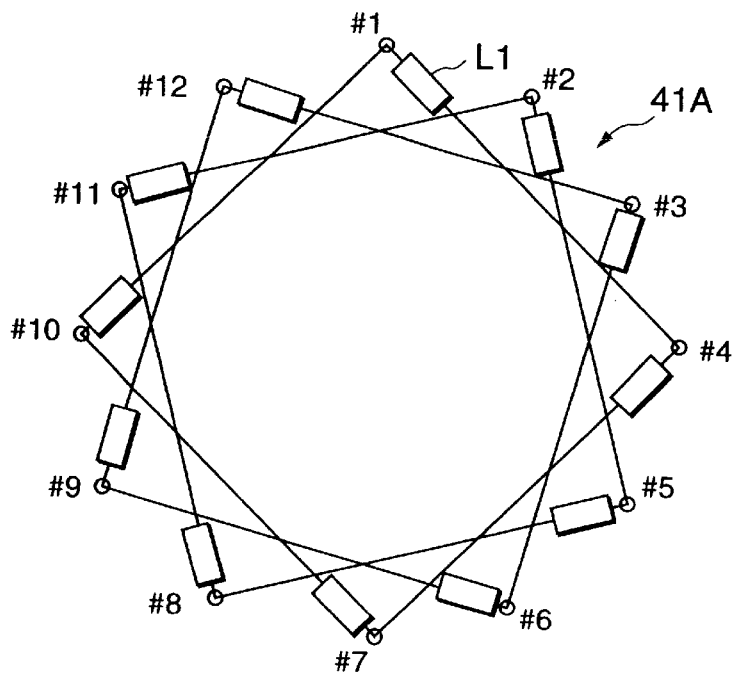

A fourteenth embodiment of this invention will be described with reference to the coil connections in FIG. 16A and FIG. 16B.

This embodiment uses stators 40A and 41A instead of stators 40 and 41 as in the ninth embodiment. The coils L1–L12 of the stator 40A are connected by a delta connection. The coils L1–L12 of the stator 41A are also connected by the delta connection.

The stator 40A forms four pairs of magnetic poles with a three-phase current in the same manner as the stator 40 of the ninth embodiment. The stator 41A forms three pairs of magnetic poles with a four-phase current in the same manner as the stator 41 of the ninth embodiment.

This invention may be adapted to a motor/generator having the above type of delta connection by using any of the drive circuits in the ninth to twelfth embodiments.

Each embodiment above shows this invention as applied to a drive circuit of a motor/generator driving two rotors by a single stator. However this invention may be applied to a drive circuit of different type of motor/generator.

For example, it is possible to apply the drive circuit of this invention to a motor in which a single stator rotates a single rotor by an alternating current of four or more phases. When a coil is disconnected or an inverter is malfunctioning, it is possible to suppress the generation of vibration, noise and torque fluctuations due to the power cut to part of the coils, by the PWM signal generating circuits 26 controlling the PWM signals based on a neutral point potential difference.

Furthermore, this invention may be applied to a drive circuit of a motor in which a single stator rotates a single rotor by an alternating current of three phases. This type of motor does not continue operation when a current to one coil is cut. However, there is the possibility that the characteristics of a coil vary while allowing flow of a current. In such an occasion, it is possible to compensate the variations in coil characteristics by the PWM signal generating circuits 26 controlling the PWM signals based on the neutral point potential difference.

The contents of Tokugan Hei 11-356180, with a filing date of Dec. 15, 1999 in Japan, and Tokugan 2000-277621 with a filing date of Sep. 13, 2000 in Japan are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A drive circuit for a motor/generator, the motor/generator having a stator and a rotor, the stator having a plurality of coils, each coil having a first terminal, the rotor rotating due to a rotating magnetic field formed by the coils when a polyphase alternating current is supplied to the first terminals of the coils, the drive circuit comprising:

a source of direct current;
an inverter converting the direct current to a polyphase alternating current based on control signals each of which corresponds to each phase of the current and supplying the polyphase alternating current to the first terminals of the coils;
a difference detection circuit which detects a difference in electrical potentials at two different neutral points in an electrical circuit constituted by the motor/generator and the drive circuit; and
a plurality of signal generating circuits each of which generates the control signal corresponding to each phase of the current in response to the difference in the electrical potentials.

2. The drive circuit as defined in claim 1, wherein each of the signal generating circuits comprises a circuit which generates the control signal based on a comparison of a carrier signal having a fixed waveform and a target value related to a current supplied to the first terminal of each coil from the inverter, and a correcting circuit which reduces the difference in the electrical potentials by correcting one of the carrier signal and the target value.

3. The drive circuit as defined in claim 2, wherein the correcting circuit comprises a circuit which corrects the carrier signal by adding the difference in the electrical potentials to the carrier signal.

4. The drive circuit as defined in claim 2, wherein the correcting circuit comprises a circuit which corrects the target value by adding the difference in the electrical potentials to the target value.

5. The drive circuit as defined in claim 4, wherein each of the signal generating circuits further comprises a limiter which limits an output of the correcting circuit to less than or equal to a fixed value.

6. The drive circuit as defined in claim 2, wherein each coil has a second terminal opposite to the first terminal, each of the signal generating circuits further comprises an input terminal for receiving the target values, and the difference detection circuit comprises a circuit which detects the difference of an electrical potential in a first neutral point which is formed by a star connection of the second terminals of the coils and an electrical potential in a second neutral point which is formed by a star connection of the input terminals via impedance components.

7. The drive circuit as defined in claim 2, wherein each coil has a second terminal opposite to the first terminal, the inverter is provided with output terminals which output the polyphase alternating current, and the difference detection circuit comprises a circuit which detects the difference of an electrical potential in a first neutral point which is formed by a star connection of the second terminals of the coils and an electrical potential in a second neutral point which is formed by a star connection of the output terminals of the inverter via impedance components.

8. The drive circuit as defined in claim 2, wherein each of the signal generating circuits further comprises an input terminal for receiving the target value, and the difference detection circuit comprises a circuit which detects the difference of an electrical potential in a first neutral point which is formed by a star connection of the first terminals via impedance components and an electrical potential in a second neutral point which is formed by a star connection of the input terminals via impedance components.

9. The drive circuit as defined in claim 2, wherein the polyphase alternating current has phases of equal to or larger than four.

\* \* \* \* \*